United States Patent
Skarp (10) Patent No.: US 8,462,478 B2
(45) Date of Patent: Jun. 11, 2013

(54) OVER-VOLTAGE PROTECTION

(75) Inventor: Carl Filip Erik Skarp, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 505 days.

(21) Appl. No.: 12/631,033

(22) Filed: Dec. 4, 2009

(65) Prior Publication Data

US 2011/0134577 A1 Jun. 9, 2011

(51) Int. Cl.
*H02H 9/04* (2006.01)
(52) U.S. Cl.
USPC .................................................. 361/91.1
(58) Field of Classification Search
USPC .................................................. 361/91.1
See application file for complete search history.

(56) References Cited

U.S. PATENT DOCUMENTS

| | | | |
|---|---|---|---|
| 5,513,060 A * | 4/1996 | Bremond | 361/58 |
| 2003/0151868 A1 | 8/2003 | Inae et al. | |
| 2004/0264878 A1 * | 12/2004 | Choi et al. | 385/78 |

FOREIGN PATENT DOCUMENTS

| | | | |
|---|---|---|---|
| GB | 2 376 795 A | | 12/2002 |
| JP | 01129063 A | * | 5/1989 |
| JP | 01318508 | | 12/1989 |
| JP | 2006147441 A | * | 6/2006 |

OTHER PUBLICATIONS

International Search Report and Written Opinion dated Mar. 8, 2011 issued in corresponding PCT application No. PCT/IB2010/055012, 11 pages.
Lacour et al.; "5-kV Switches on Flexible Plastic Substrate for Electro-Active Polymer Actuators," Device Research Conference, Jun. 23-25, 2003, pp. 83-84.
International Preliminary Report on Patentability dated Jun. 14, 2012 issued in corresponding PCT application No. PCT/IB2010/055012, 6 pages.

* cited by examiner

*Primary Examiner* — Rexford Barnie
*Assistant Examiner* — Ann Hoang
(74) *Attorney, Agent, or Firm* — Snyder, Clark, Lesch & Chung, LLP (57) ABSTRACT

A device may include a switch and a circuit coupled to the switch. The switch may include a structure with a top portion and a bottom portion and a material included within the structure. The material is configured to expand within the structure when voltage is applied to the material. The switch may also include a conductive element located in a bottom portion of the structure and connected to the material, wherein the conductive element operates to electrically close the switch when the applied voltage exceeds a threshold. The circuit includes a resistor. The circuit is configured to reduce the voltage supplied to components of the device when the switch is closed.

17 Claims, 6 Drawing Sheets

OVER-VOLTAGE PROTECTION

TECHNICAL FIELD OF THE INVENTION

The invention relates generally to over-voltage protection and, more particularly, to controlled over-voltage protection.

DESCRIPTION OF RELATED ART

Electronic devices, such as communication devices, lap top computers, personal computers etc., have become increasingly important in every day life. As a result, protecting these devices from voltage spikes or other voltage/current-related problems is very important to users from both a reliability perspective and a safety perspective.

In typical devices, a fuse may be used to protect components from an over-voltage condition. One drawback with using fuses is that after the over-voltage condition occurs, the fuse may require replacement or manual handling to return the device back to working condition. Replacement and/or handling of fuses is time consuming and difficult for many users.

SUMMARY

According to a first aspect, a device comprising a switch and a circuit is provided. The switch includes a structure that has a top portion and a bottom portion and a material included within the structure, wherein the material is configured to expand within the structure when voltage is applied to the material. The structure also includes a conductive element located in a bottom portion of the structure and connected to the material, wherein the conductive element operates to electrically close the switch when the applied voltage exceeds a threshold. The circuit is coupled to the switch, wherein the circuit includes a resistor, and the circuit is configured to reduce the voltage supplied to components of the device when the switch is closed.

Additionally, the material may comprise an electroactive polymer (EAP).

Additionally, the conductive element may comprise a metallic disk that is configured to move within the structure as the EAP expands.

Additionally, the structure may comprise a cylindrical structure.

Additionally, the resistor provides a controlled voltage drop associated with an over-voltage condition when the switch is closed.

Additionally, the switch may further comprise a connector, and wherein the conductive element is configured to electrically contact the connector when the applied voltage exceeds the threshold.

Additionally, the switch may be further configured to open when the applied voltage is less than the threshold.

Additionally, when the applied voltage is less than the threshold, the conductive element may be configured to move within the cylinder such that it does not contact the connector and the switch opens.

Additionally, the device may comprise a mobile telephone.

According to another aspect, a method is provided. The method includes receiving, by a switch that includes an electroactive polymer (EAP) material, a voltage and closing the switch when the voltage exceeds a threshold. The method also includes reducing voltage applied to components of a device when the switch is closed, and opening the switch when the received voltage is below the threshold.

Additionally, the switch may comprise a structure configured to house the EAP material, a conductive disk located adjacent a portion of the EAP material, and an electrical connector, and closing the switch may comprise moving the conductive disk in a first direction within the structure when the voltage exceeds the threshold such that the conductive disk electrically contacts the electrical connector.

Additionally, opening the switch may comprise moving the conductive disk in a second direction within the structure when the voltage is below the threshold such that the conductive disk does not electrically contact the electrical connector.

Additionally, moving the conductive disk in a first direction and a second direction may be performed based on expansion and contraction, respectively, of the EAP material.

According to still another aspect, a device includes a switch. The switch includes an electroactive polymer (EAP) material, and a conductive element located adjacent the EAP material, wherein the conductive element is configured to move when the EAP material expands and to electrically close the switch when a voltage applied to the EAP material exceeds a threshold.

Additionally, the device may further comprise a resistor coupled to the switch, wherein the resistor and switch are configured to reduce the voltage supplied to components of the device when the switch is closed.

Additionally, the switch may be further configured to open or remain open when the voltage applied to the EAP material is less than the threshold.

Additionally, the switch may further comprise an electrical connector configured to electrically contact the conductive element when the voltage applied to the EAP material exceeds the threshold.

Additionally, the device may further comprise a plurality of components and a power source connected to the switch, the power source being configured to supply voltage to the EAP material. The device may further comprise a resistor coupled to the switch, wherein the switch and the resistor are connected in parallel with the power source, and when voltage from the power source exceeds the threshold, the resistor is configured to reduce voltage supplied from the power source to at least one of the plurality of components.

Additionally, the device may comprise an electronic device.

Additionally, the device may comprise a power distribution device.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
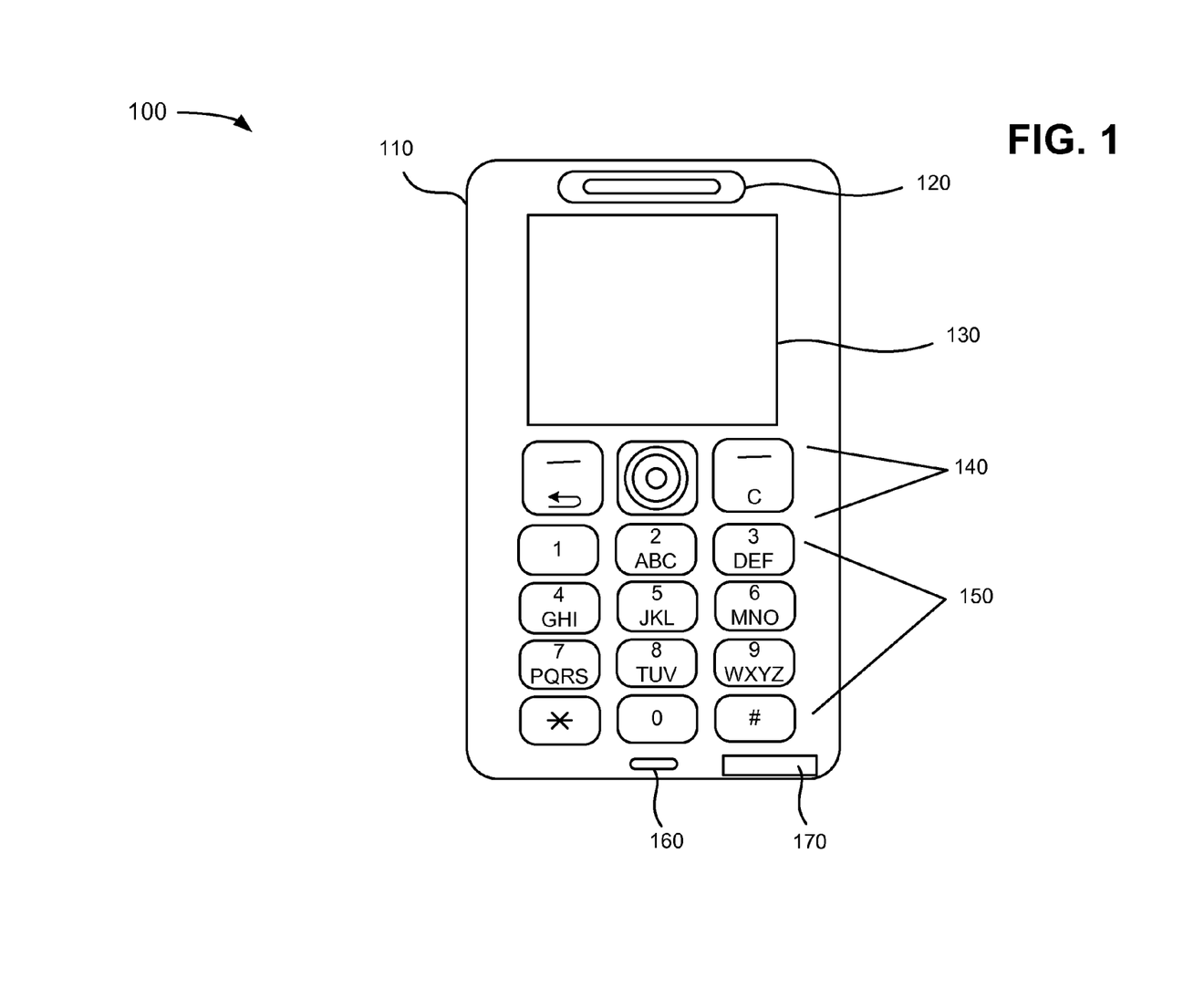
FIG. 1 is a diagram of an exemplary device in which devices, systems and methods described herein may be implemented.

FIG. 1 is a diagram of an exemplary user device 100 which may be used in conjunction with devices, systems and methods described herein. In an exemplary implementation, user device 100 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Referring to FIG. 1, user device 100 may include housing 110, speaker 120, display 130, control buttons 140, keypad 150, microphone 160 and connector 170. It should be understood that user device 100 may include other and/or different components. For example, user device 100 may include a camera and a flash mechanism used to take pictures and/or videos.

Housing 110 may protect the components of user device 100 from outside elements. Speaker 120 may provide audible information to a user of user device 100. Display 130 may provide visual information to the user. For example, display 130 may provide information regarding incoming or outgoing telephone calls and/or incoming or outgoing electronic mail (e-mail), instant messages, short message service (SMS) messages, etc. Control buttons 140 may permit the user to interact with user device 100 to cause user device 100 to perform one or more operations, such as place a telephone call, play various media, take a picture, etc.

For example, control buttons 140 may include a dial button, hang up button, play button, a shutter button, etc. Keypad 150 may include a standard telephone keypad. Microphone 160 may receive audible information from the user. Connector 170 may be a connector or interface used for charging user device 100. In an exemplary implementation, connector 170 may be accessible from the exterior of user device 100.

Aspects of the invention are described herein in the context of protecting a portable device, such as user device 100, from an over-voltage condition. It should also be understood that devices, systems and methods described herein may also be used with other types of devices, such as a personal computer (PC), a laptop computer, a PDA, a media playing device (e.g., an MPEG audio layer 3 (MP3) player, a video game playing device), or other device that may not include various communication functionality for communicating with other devices. Still further, devices, systems and methods described herein may be used in medium or high voltage applications, such as in power transformers.

Figure 2:
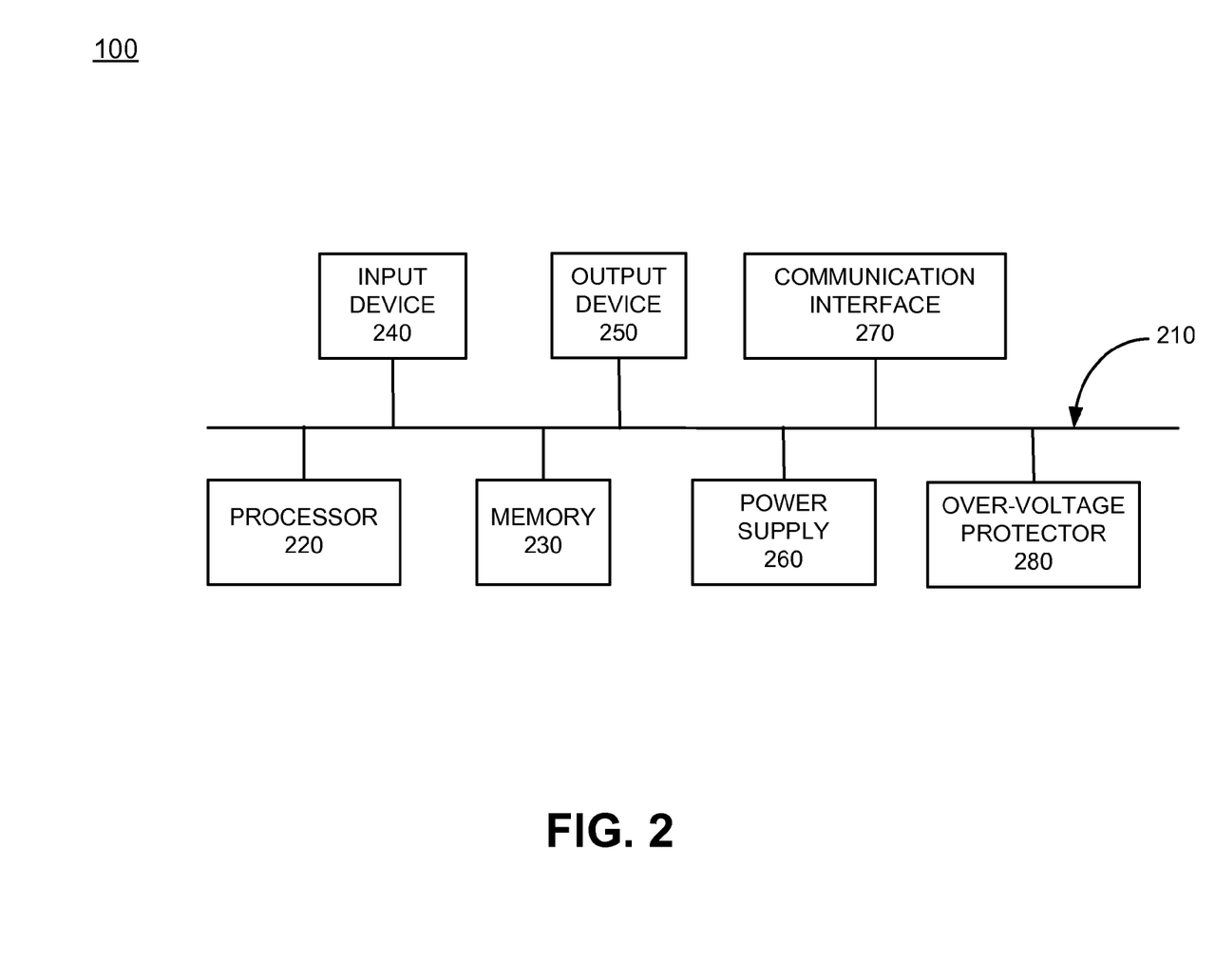
FIG. 2 is a functional block diagram of exemplary components implemented in the device of FIG. 1.

FIG. 2 is a diagram illustrating components of user device 100 according to an exemplary implementation. User device 100 may include bus 210, processor 220, memory 230, input device 240, output device 250, power supply 260, communication interface 270 and over-voltage protector 280. Bus 210 permits communication among the components of user device 100. One skilled in the art would recognize that user device 100 may be configured in a number of other ways and may include other or different elements. For example, user device 100 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 100, such as microphone 160, keypad 150, control buttons 140, a keyboard (e.g., a QWERTY keyboard, a Dvorak keyboard), a gesture-based device, an OCR based device, a joystick, a virtual keyboard, a speech-to-text engine, a mouse, a pen, voice recognition and/or biometric mechanisms, etc.

Output device 250 may include one or more mechanisms that output information to the user, including a display, such as display 130, a printer, one or more speakers, such as speaker 120, etc. Power supply 260, also referred to herein as battery 260, may include one or more batteries or other power source components used to supply power to components of user device 100.

Communication interface 270 may include one or more transceivers that enable user device 100 to communicate with other devices via wired, wireless or optical mechanisms. For example, communication interface 270 may include one or more radio frequency (RF) transmitters, receivers and/or transceivers and one or more antennas for transmitting and receiving RF data. Communication interface 270 may also include a modem or an Ethernet interface to a local area network (LAN) for communicating via a network.

Over-voltage protector 280 may include components to protect user device 100 from an over-voltage condition, such as a voltage spike. In an exemplary implementation, over-voltage protector 280 may use materials that change their physical dimensions when placed in an electric field or when voltage is applied. For example, over-voltage protector 280 may use an electroactive polymer (EAP) material that expands when voltage is applied, as described in more detail below. In some implementations, over-voltage protector 280 may include circuitry that allows for a controlled reduction of voltage associated with an over-voltage condition, as described in detail below.

User device 100 may provide a platform for a user to make and receive telephone calls, send and receive messages (e.g., electronic mail, text messages, multi-media messages, SMS messages, etc.), play music, play games, take pictures/videos and execute various other applications. User device 100, as described in detail below, may also perform processing associated with protecting user device 100 from an over-voltage condition. In an exemplary implementation, user device 100 may perform all or some of these operations in response to processor 220 executing sequences of instructions contained in a computer-readable medium, such as memory 230. Such instructions may be read into memory 230 from another computer-readable medium via, for example, communication interface 270. A computer-readable medium may include one or more memory devices. In alternative embodiments, hardwired circuitry may be used in place of or in combination with software instructions to implement processes consistent with the invention. Thus, implementations described herein are not limited to any specific combination of hardware circuitry and software.

Figure 3:
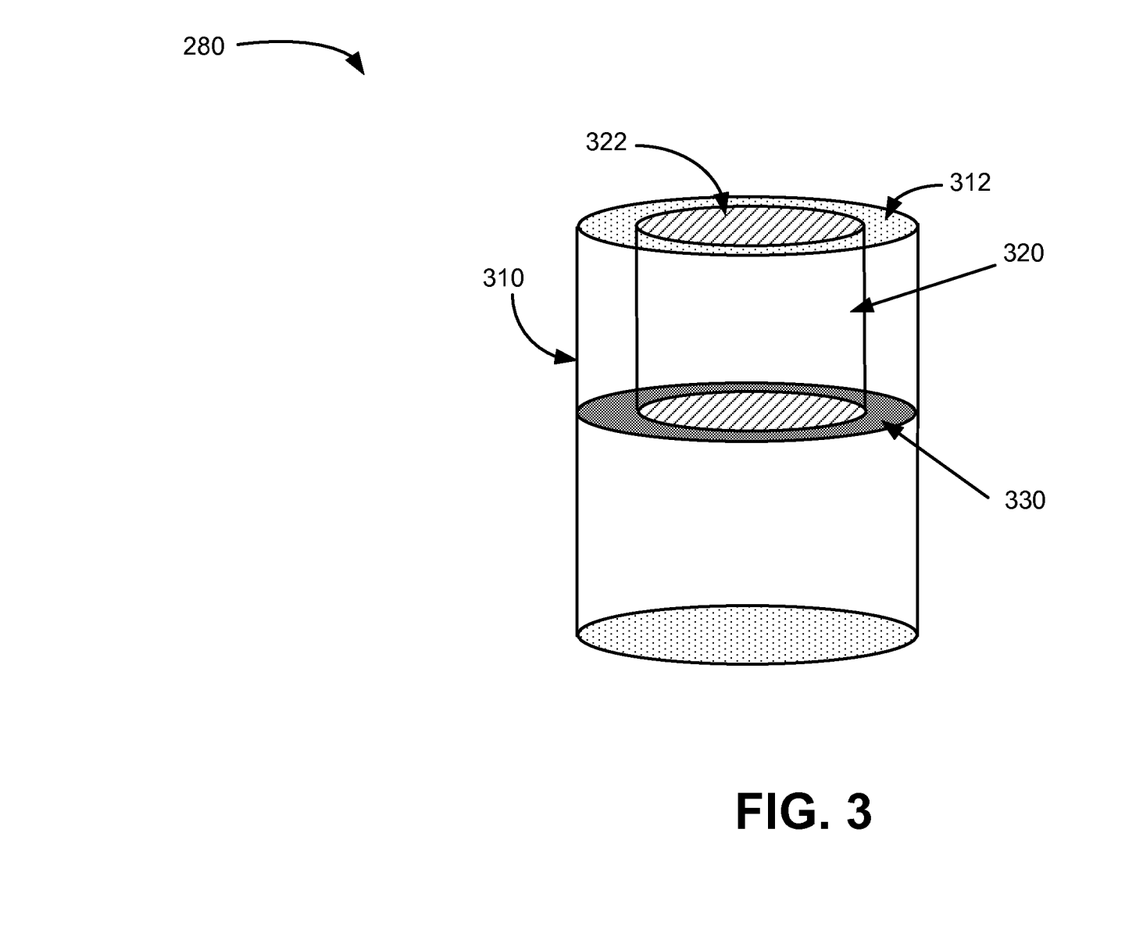
FIG. 3 is a block diagram of exemplary components of the over-voltage protector of FIG. 2.

FIG. 3 is a diagram illustrating components of over-voltage protector 280 according to an exemplary implementation. Referring to FIG. 3, over-voltage protector 280 may include structure 310, EAP material 320 and conductive disk 330. The configuration illustrated in FIG. 3 is provided for simplicity. In other implementations, over-voltage protector 280 may include additional elements, such as electrical circuitry used to provide controlled protection from an over-voltage condition, as described in detail below.

Structure 310 may include a structural component used to house EAP material 320. In FIG. 3, structure 310 is illustrated as being cylindrical in shape. It should be understood that in alternative implementations, structure 310 may have other shapes (e.g., cuboid, ovoid, etc.). The top portion of structure 310 (also referred to herein as cylinder 310) labeled 312 may include an electrically insulating material.

EAP material 320, as discussed above, may include a material that changes physical dimensions and/or shape when placed in an electric field or when voltage is applied. For example, in an exemplary implementation, EAP material 320 may include a dielectric EAP material or an ionic EAP material that expands axially within cylinder 310 when voltage is applied to the top portion of EAP material 320, labeled 322 in FIG. 3.

Conductive disk 330 may include a metallic disk that connects to the bottom side of EAP material 320, as illustrated in FIG. 3. As EAP material 320 expands, conductive disk 330 moves within cylinder 310. For example, conductive disk 330 may slide within cylinder 310 as EAP material 320 expands. The expansion of EAP material 320 and movement of conductive disk 320 may be used to close an over-voltage protection switch, as described in more detail below.

In some implementations, a length or depth of structure 310 may be significantly different from a width or height of structure 310 based on, for example, the voltage levels being monitored by over-voltage protector 280, as well as voltage levels expected during an over-voltage condition. For example, in some implementations the width and/or depth of structure 310 may be much less than the length of structure 310. In addition, in implementations in which over-voltage protector 280 is monitoring relatively low voltages, the length of structure 310 may be relatively short (e.g., less than one centimeter) and the length/distance of the gap (e.g., air gap) between conductive disk 330 and the bottom of structure 310 may also be small. In implementations in which high voltage levels are being monitored, the length of structure 310 may be relatively long (e.g., several centimeters or more) and the length/distance of the gap between conductive disk 330 and the bottom of structure 310 may also be relatively long.

In addition, the distance or gap between conductive disk 330 and the bottom of cylinder 320 may vary based on the particular voltages and/or device being monitored. For example, in situations in which the normal variations in voltages are fairly large and the components of the device being protected (e.g., user device 100) allow for a fairly wide range of voltages, the distance between conductive disk 330 and the bottom of cylinder 320 during normal operating conditions (e.g., normal voltage condition) may be relatively large to allow for greater expansion of EAP material 320 without closing an over-voltage protection switch. However, in situations in which the components of the device being protected are particular sensitive to voltage fluctuations (which may result in damage to the components), the distance between conductive disk 330 and the bottom of cylinder 310 during normal operating conditions may be relatively small to ensure that the components of the device are adequately protected.

The configuration of over-voltage protector 280 in FIG. 3 is exemplary only. For example, as described above, in other implementations, structure 310 may have other shapes. In addition, other materials that expand when voltage is applied may be used in place of or in combination with EAP material 320 in other implementations.

Figure 4A:
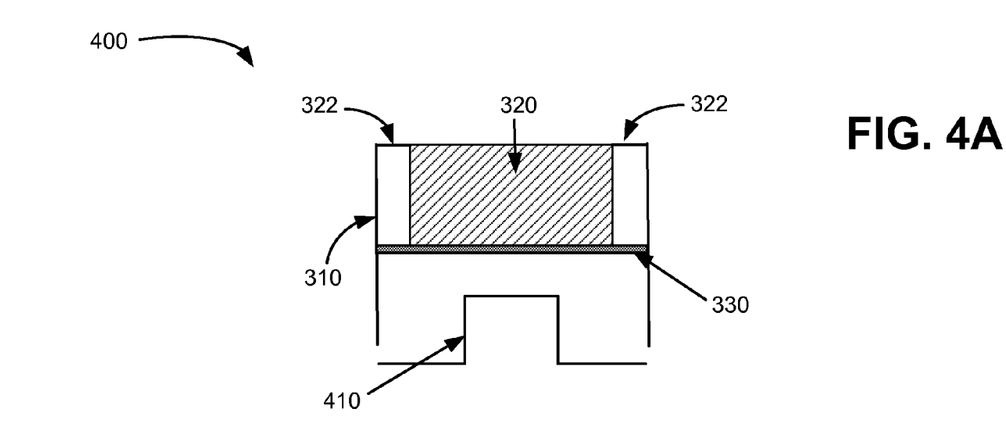
FIGS. 4A and 4B are cross-sectional views of an over-voltage protection switch that includes the components illustrated in FIG. 2.

FIG. 4A is a cross-section of the portion of over-voltage protector 280 of FIG. 3. Referring to FIG. 4A, over-voltage protector 280 may include an over-voltage protection switch (OVPS) 400 that includes cylinder 310, EAP material 320, conductive disk 330 and connector 410. OVPS 400 may be used in connection with an electrical circuit to control over-voltage conditions, as described in detail below. As illustrated in FIG. 4A, EAP material 320 may be contained in an upper portion of cylinder 310 when user device 100 is in a normal operating condition. That is, when a normal operating voltage associated with operation of user device 100 is applied to EAP material 320, EAP material 320 may be contained within the upper portion of cylinder 310 and conductive disk 330 may not contact connector 410.

Figure 4B:
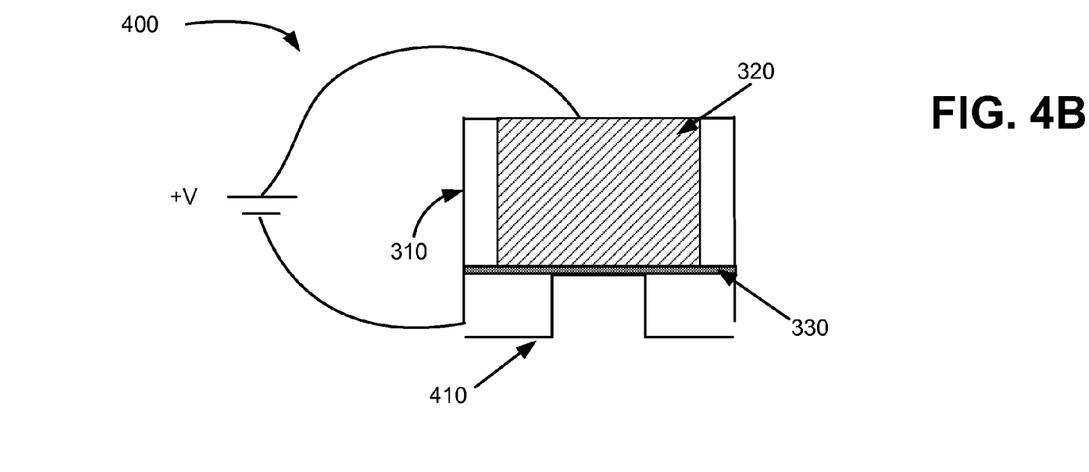

In an exemplary implementation, conductive disk 330 electrically contacts the sides of cylinder 310, as illustrated in FIG. 4A. This may allow cylinder 310 to act as one pole of a connection for OVPS 400. When voltage above a threshold voltage is applied to EAP material 320, EAP material 320 may expand within cylinder 310 such that conductive disk 330 may contact connector 410, as illustrated in FIG. 4B. When conductive disk 330 contacts connector 420, this may effectively close OVPS 400 to protect components of user device 100, as described in more detail below.

Figure 5A:
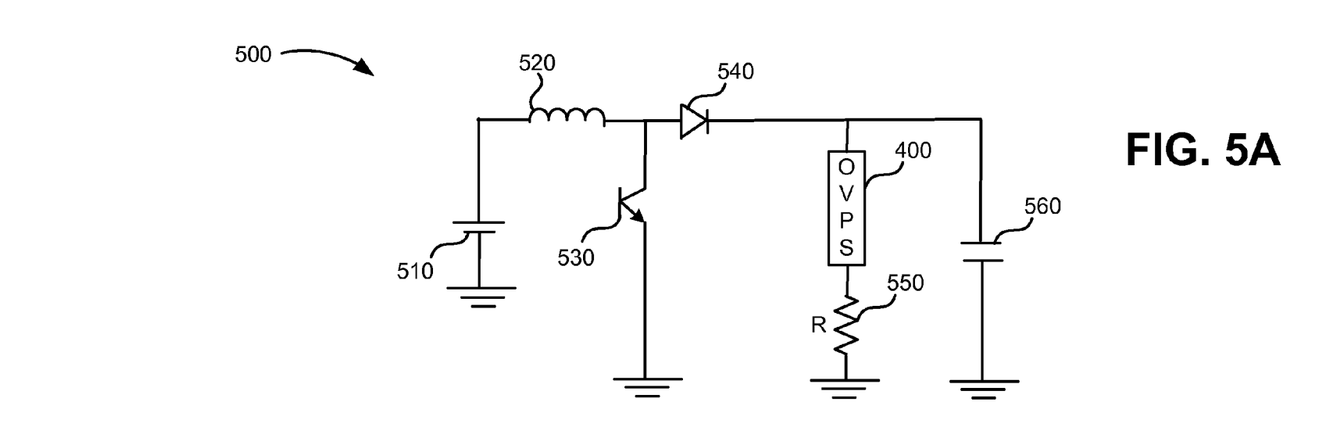
FIG. 5A illustrates an exemplary over-voltage protection circuit that includes the over-voltage protection switch of FIGS. 4A and 4B.

As described above, OVPS 400 may be used in conjunction with circuitry that permits over-voltage protector 280 to control an over-voltage condition without shutting down user device 100. For example, FIG. 5A illustrates an exemplary circuit 500 that includes OVPS 400. Referring to FIG. 5A, circuit 500 may include a direct current (DC) to DC (DC-DC) converter that is used in device 100 to provide power to components of user device 100. The DC-DC converter may include voltage source 510, inductor 520, transistor 530, diode 540, and capacitor 560. Circuit 500 may also include OVPS 400 and resistor 550. In an exemplary implementation, OVPS 440 and resistor 550 may be included in over-voltage protector 280 and may be connected in parallel with voltage source 510 to reduce voltage supplied by voltage source 510 when an over-voltage condition occurs, as described in more detail below.

Voltage source 510 may represent a voltage or power source, such as a DC voltage source, within user device 100 that may be monitored for an over-voltage condition by OVPS 400. Voltage source 510 may be associated with powering components of user device 100. As an example, voltage source 510 may be located in series with power supply 260 and voltage source 510 may represent the primary power source associated with powering user device 100. In each case, voltage source 510 may represent a voltage generated within user device 100 that may be monitored for an over-voltage condition.

Transistor 530 may be connected between a ground point and a point coupled to an output of inductor 520 and an input of diode 540. Transistor 530 may be used to drive current through inductor 520 when transistor 530 is closed, thereby increasing the voltage across capacitor 560 when transistor 530 is open. Inductor 520 may be designed to filter out specific frequencies from the direct current output of voltage source 510 from being transmitted to other devices in circuit 500. Diode 540 may be designed to protect components located upstream of diode 540 from reverse currents generated in the DC-DC converter. Capacitor 560 may be connected to an output of diode 540 and in parallel with OVPS 400. The voltage across capacitor 560 may represent the output voltage of the DC-DC converter circuit. This output voltage may be used to power some or all of the components of user device 100.

In an exemplary implementation, OVPS 400 may be connected to the output of diode 540. Resistor 550 may be connected in series with OVPS 400, such that OVPS 400 and resistor 550 are connected in parallel with voltage source 510. OVPS 400 may monitor the voltage to detect an over-voltage condition and to control the over-voltage condition without necessarily shutting down operation of user device 100. For example, the output voltage produced across capacitor 560 may be reduced via OVPS 400 and resistor 550, thereby allowing an over-voltage condition to be handled in a controlled manner, as described in more detail below.

Figure 5B:
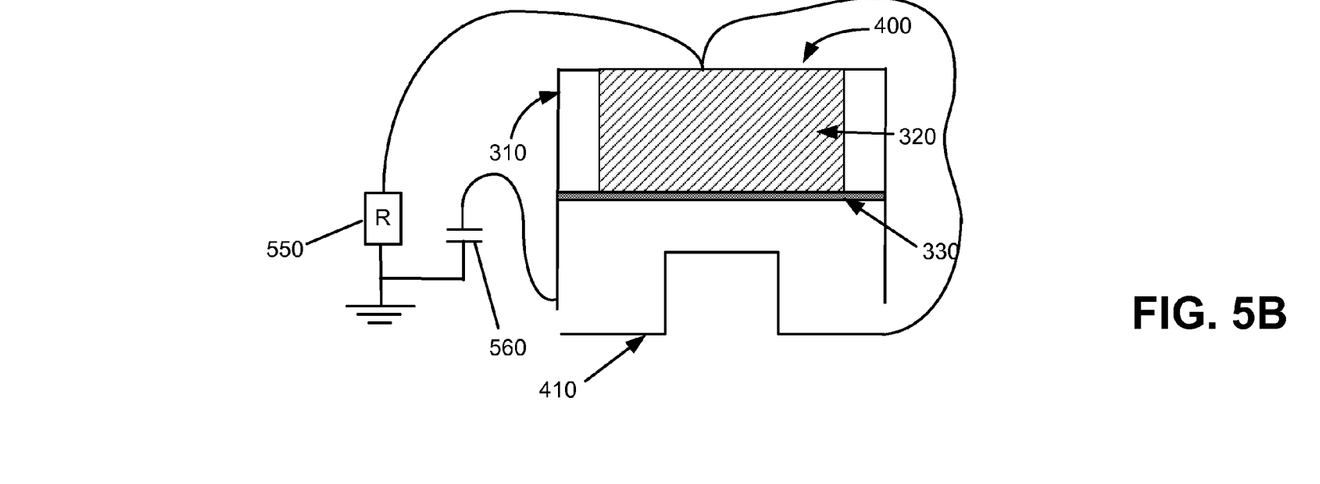
FIG. 5B illustrates connections associated with components illustrated in FIG. 4A with respect to the over-voltage protection circuit of FIG. 5A.

FIG. 5B is a detailed diagram of components of OVPS 400 connected to components of circuit 500 according to an exemplary implementation. As illustrated, connector 410 of OVPS 400 may be electrically connected to resistor 550 and the side of cylinder 310 of OVPS 400 may be connected to the other leg of resistor 550 through capacitor 560. When the connection is completed (e.g., conductive disk 330 contacts connector 410), resistor 550 is connected in parallel with voltage source 510. Resistor 550 is also connected in parallel with elements that over-voltage protector 280 is attempting to protect. Resistor 550 may act to reduce or discharge the over-voltage condition, as described in detail below.

Figure 6:
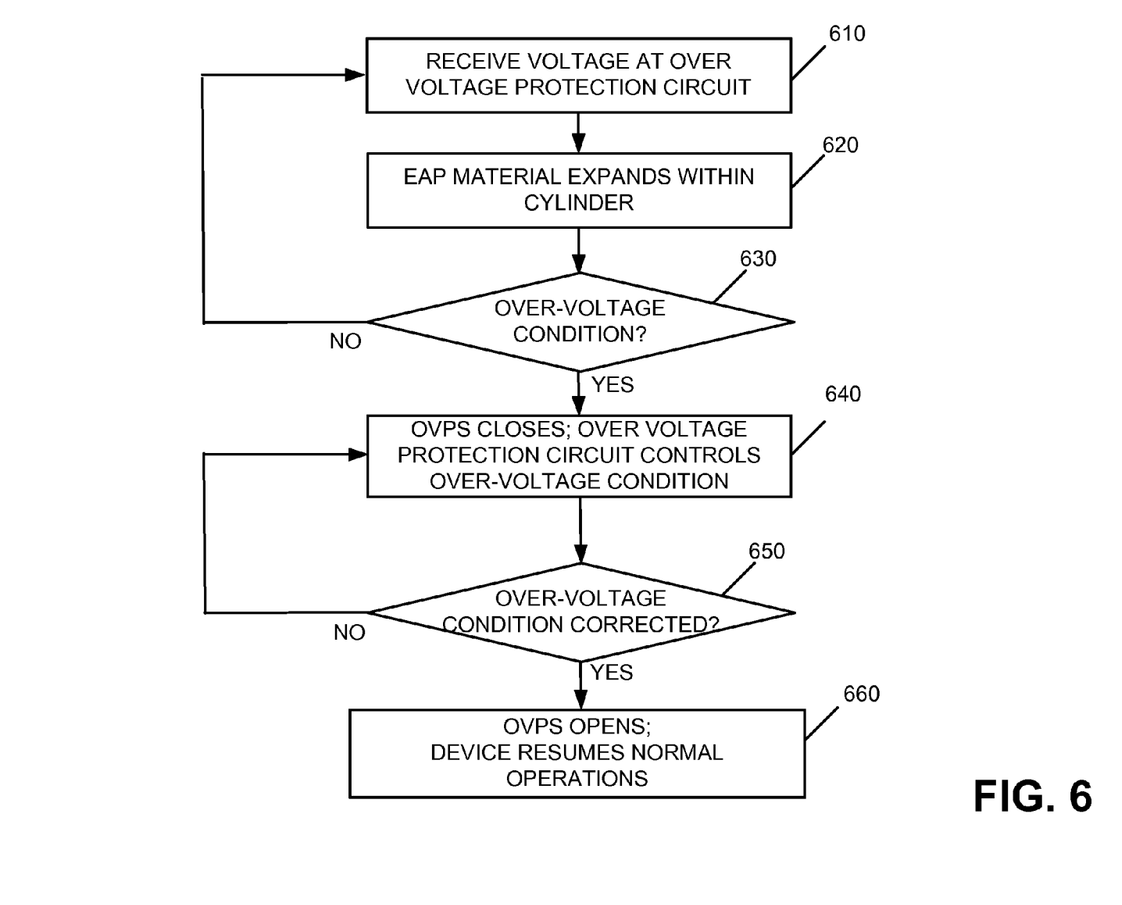
FIG. 6 illustrates exemplary processing associated with providing over-voltage protection consistent with implementations described herein.

FIG. 6 is a flow diagram illustrating exemplary processing associated with controlling an over-voltage condition with respect to user device 100. Processing may begin with user device 100 being powered up or being charged. For example, assume that user device 100 is turned on and a user is interacting with user device 100 to access the Internet, place a telephone call, take a picture, etc. In such a condition, over-voltage protector 280 may receive a voltage (act 610).

For example, assume that voltage source 510 in FIG. 5A corresponds to the normal operating voltage associated with user device 100. As also illustrated in FIG. 5A, OVPS 400 may be electrically coupled to voltage source 510 via inductor 520 and diode 540. As described above with respect to FIGS. 4A and 4B, when voltage is applied to OVPS 400, EAP material 320 within OVPS 400 may expand within cylinder 310 (act 620). During normal operating conditions, EAP material 320 may expand to the level illustrated in FIG. 4A. That is, the EAP material 320 may not expand such that conductive disk 330 makes electrical contact with connector 410.

Over-voltage protector 280 may determine whether an over-voltage condition occurs (act 630). If not (act 630—no), processing may return to act 610. That is, over-voltage protector 280 may continue to receive a voltage from voltage source 510 and EAP material 320 may expand/contract based on the applied voltage. However, if an over-voltage condition occurs (act 630—yes), EAP material 320 may expand within cylinder 310 and conductive disk 330 may electrically contact connector 410. OVPS 400 may close and circuit 500 may control the over-voltage condition (act 640). For example, with OVPS 400 closed, current may flow through resistor 550 to a ground. The resulting output voltage at capacitor/load 560 may be reduced. In this manner, circuit 500 allows for a controlled voltage drop when an over-voltage condition occurs, as opposed to a conventional fuse that causes a hard short to ground when an over-voltage condition occurs. That is, connecting OVPS 400 and resistor 550 in parallel with voltage source 510 and in parallel with components that over-voltage protector 280 is designed to protect, the output voltage of the DC-DC converter is reduced to a level that may be acceptable to components of user device 100.

Continuing with this example, over-voltage protector 280 may continue to monitor the voltage via OVPS 400. If the over-voltage condition is not corrected (act 650—no), OVPS 400 remains closed and circuit 500 continues to control the over-voltage condition. If, however, the over-voltage condition is corrected (act 650—yes), OVPS 400 opens (act 660). In this situation, resistor 550 is effectively disconnected from circuit 500 and user device 100 resumes normal operations (act 660). That is, when the voltage applied to EAP material 320 is reduced to the normal level, EAP material 320 may contract and conductive disk 330 will move in the opposite direction (e.g., away from connector 410) such that conductive disk 330 does not electrically contact connector 410. OVPS 400 may then open, thereby effectively disconnecting resistor 550 from circuit 500.

In this manner, over-voltage protector 280 may monitor voltage within user device and provide for a controlled reduction in voltage when an over-voltage condition exists. In addition, when the over-voltage condition ends and normal operating voltages exist, over-voltage protector 280 returns user device 100 to the normal operating mode without the user having to perform any resetting or replacing of a fuse or other over-voltage protector.

CONCLUSION

Implementations described herein provide for controlled over-voltage protection using a material that expands based on an applied voltage. In addition, when the over-voltage condition no longer exists, the device being protected automatically returns to normal operating conditions without requiring any manual intervention by the user.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein refer to providing protection to one or more components of user device 100. It should be understood that over-voltage protector 280 may be configured to protect all components of user device 100 or some components of user device 100 based on the particular configuration. For example, over-voltage protector 280 may be connected in parallel with the main power source of user device 100 to protect all components of user device 100 that receive power from the main power source. Alternatively, over-voltage protector 280 may be connected in parallel with a particular element or elements to protect those elements. As an example, a camera and/or camera flash component (e.g., a xenon flash) may be protected from an over-voltage condition by connecting over-voltage protector 280 in parallel with the camera/flash.

In addition, aspects have been described above with respect to using over-voltage protector 280 within an electronic device (e.g., user device 100). In other implementations, over-voltage protector 280 may be used in industrial or power-related scenarios to protect equipment and provide controlled voltage protection. For example, over-voltage protector 280 may be used in connection with power distribution equipment, such as transformers or other medium/high power devices and/or power connectors. In such scenarios, the size of structure 310 and the amount of EAP material may be designed based on the particular voltages/ranges of expected voltages. That is, the gap (e.g., air gap) provided between conductive disk 330 and an electrical connector (e.g., connector 410) when the over-voltage condition does not exist may be sized to provide adequate distance/separation to prevent an inadvertent short circuiting and closing of the over-voltage protection switch.

Still further, implementations described above illustrate OVPS 400 connected in series with resistor 550 to control the voltage output by a power source. The particular value of resistor 550 may be based on the particular voltages being monitored and the voltages expected with the over-voltage condition. In addition, a single resistor 550 is described above as being connected to OVPS 400. It should be understood that any resistive element or combination of elements may be used.

In addition, aspects have been described above with respect to using EAP material and an exemplary circuit used in conjunction with the EAP material. In other implementations, other materials that expand and/or other circuitry may be used to provide controlled over-voltage protection. In addition, aspects have been described above with respect to using an over-voltage protection switch in conjunction with a control circuit that will reduce voltages applied to components of the device. In other implementations, the over-voltage protection switch described above may be used to cut power to a device when an over-voltage protection condition exists. That is, the over-voltage protection switch may be used without use of the control circuit.

Further, while series of acts have been described with respect to FIG. 6, the order of the acts may be varied in other implementations consistent with the invention. Moreover, non-dependent acts may be performed in parallel.

It will also be apparent to one of ordinary skill in the art that aspects of the invention, as described above, may be implemented in, for example, charging cables, computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, or an FPGA, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

What is claimed is:

1. A device, comprising:
   a switch comprising:
      a structure including a top portion and a bottom portion,
      an electroactive polymer (EAP) material included within the structure, wherein the EAP material is configured to expand within the structure when voltage is applied to the material, and
      a conductive element located in a bottom portion of the structure and connected to the EAP material, wherein the conductive element is configured to move when the EAP material expands and operates to electrically close the switch when the applied voltage exceeds a threshold; and
   a circuit coupled to the switch, wherein the circuit includes a resistor, and the circuit is configured to reduce the voltage supplied to components of the device when the switch is closed.

2. The device of claim 1, wherein the conductive element comprises a metallic disk that is configured to move within the structure as the EAP expands.

3. The device of claim 1, wherein the structure comprises a cylindrical structure.

4. The device of claim 1, wherein the resistor provides a controlled voltage drop associated with an over-voltage condition when the switch is closed.

5. The device of claim 1, wherein the switch further comprises:
   a connector, and wherein the conductive element is configured to electrically contact the connector when the applied voltage exceeds the threshold.

6. The device of claim 5, wherein the switch is further configured to open when the applied voltage is less than the threshold.

7. The device of claim 6, wherein the structure comprises a cylinder and when the applied voltage is less than the threshold, the conductive element is configured to move within the cylinder such that it does not contact the connector and the switch opens.

8. The device of claim 1, wherein the device comprises a mobile telephone.

9. A method, comprising:
  receiving, by a switch that includes an electroactive polymer (EAP) material, a voltage, wherein the switch comprises a structure configured to house the EAP material, a conductive disk located adjacent a portion of the EAP material, and an electrical connector;
  closing the switch when the voltage exceeds a threshold, wherein closing the switch comprises:
    moving the conductive disk in a first direction within the structure when the voltage exceeds the threshold such that the conductive disk electrically contacts the electrical connector;
  reducing voltage applied to components of a device when the switch is closed; and
  opening the switch when the received voltage is below the threshold.

10. The method of claim 9, wherein opening the switch comprises:
  moving the conductive disk in a second direction, opposite the first direction, within the structure when the voltage is below the threshold such that the conductive disk does not electrically contact the electrical connector.

11. The method of claim 10, wherein the moving the conductive disk in a first direction and a second direction is performed based on expansion and contraction, respectively, of the EAP material.

12. A device, comprising:
  a switch comprising:
    an electroactive polymer (EAP) material, and
    a conductive element located adjacent the EAP material, wherein the conductive element is configured to move when the EAP material expands and to electrically close the switch when a voltage applied to the EAP material exceeds a threshold;
  a plurality of components;
  a power source connected to the switch, the power source being configured to supply voltage to the EAP material; and
  a resistor coupled to the switch, wherein the switch and the resistor are connected in parallel with the power source, and when the voltage from the power source exceeds the threshold, the resistor is configured to reduce the voltage supplied from the power source to at least one of the plurality of components.

13. The device of claim 12, wherein the resistor and switch are configured to reduce the voltage supplied to the at least one of the plurality of components when the switch is closed.

14. The device of claim 12, wherein the switch is further configured to open or remain open when the voltage applied the EAP material is less than the threshold.

15. The device of claim 12, wherein the switch further comprises an electrical connector configured to electrically contact the conductive element when the voltage applied to the EAP material exceeds the threshold.

16. The device of claim 12, wherein the device comprises an electronic device.

17. The device of claim 12, wherein the device comprises a power distribution device.

* * * * *